United States Patent [19]

Beakes et al.

[11] Patent Number: 5,090,107
[45] Date of Patent: Feb. 25, 1992

[54] APPARATUS FOR INSERTING STATOR COIL LEAD WIRES INTO TERMINALS HAVING WIRE-RECEIVING CHANNELS

[75] Inventors: John M. Beakes; Howard S. Hunter, both of Fairborn, Ohio

[73] Assignee: Globe Products Inc., Huber Heights, Ohio

[21] Appl. No.: 632,637

[22] Filed: Dec. 26, 1990

Related U.S. Application Data

[63] Continuation of Ser. No. 511,413, Apr. 20, 1990, abandoned.

[51] Int. Cl.$^5$ .............................................. H01R 43/04
[52] U.S. Cl. ...................... 29/566.3; 29/596; 29/732; 29/736
[58] Field of Search .............. 29/732, 734, 736, 863, 29/596, 566.1, 566.3

[56] References Cited

U.S. PATENT DOCUMENTS

| | | | |
|---|---|---|---|
| 3,725,707 | 4/1973 | Leimbach et al. | |
| 3,747,187 | 7/1973 | Calwell | 29/863 |
| 3,760,339 | 9/1973 | Marshall | |
| 3,812,577 | 5/1974 | Compton et al. | 29/597 |
| 4,428,113 | 1/1984 | Fischer et al. | |
| 4,553,319 | 11/1985 | Fischer et al. | |
| 4,633,577 | 1/1987 | Banner | |
| 4,827,601 | 5/1987 | Banner | |
| 4,951,379 | 8/1990 | Clemenz | 29/597 |

FOREIGN PATENT DOCUMENTS

| | | |
|---|---|---|
| 0331906 | 9/1989 | European Pat. Off. |
| 2,219,764 | 11/1972 | Fed. Rep. of Germany |
| 2013533 | 8/1979 | United Kingdom |
| 2092029 | 8/1982 | United Kingdom |

Primary Examiner—Carl E. Hall

[57] ABSTRACT

Connection of stator coil lead wires to terminals with channels is accomplished using an industrial robot and tooling for guiding the lead wires into the terminal channels and for protecting the terminals from being snagged by the wire or being bent by the pulling of the wire by the robot. During an early stage of movement of the robot to effect connection of a lead wire to a terminal, the tooling is partly retracted to expose part of the terminal in order to simplify the movements of the robot. The lead wires are cut and crimped by tabs on the terminals using the end effector of the robot.

4 Claims, 3 Drawing Sheets

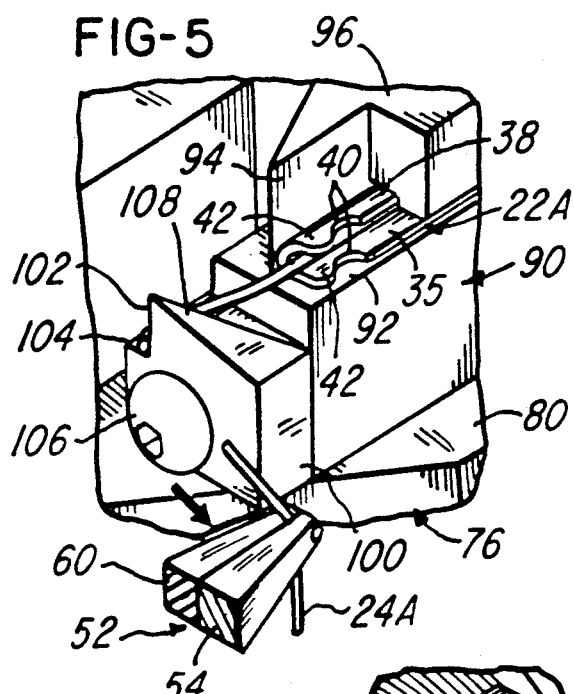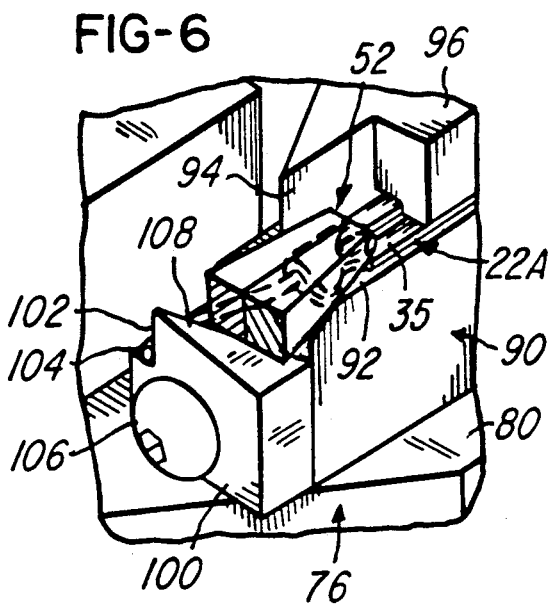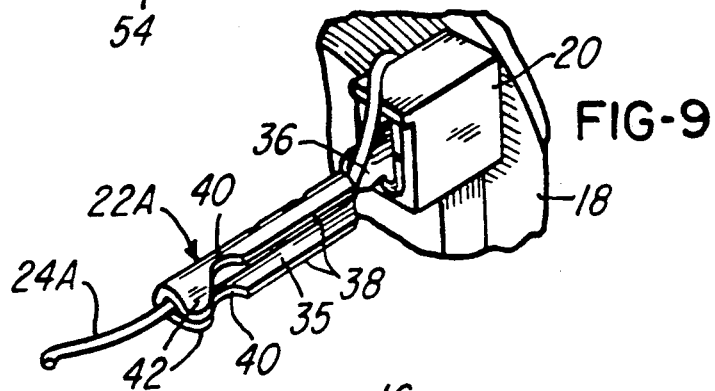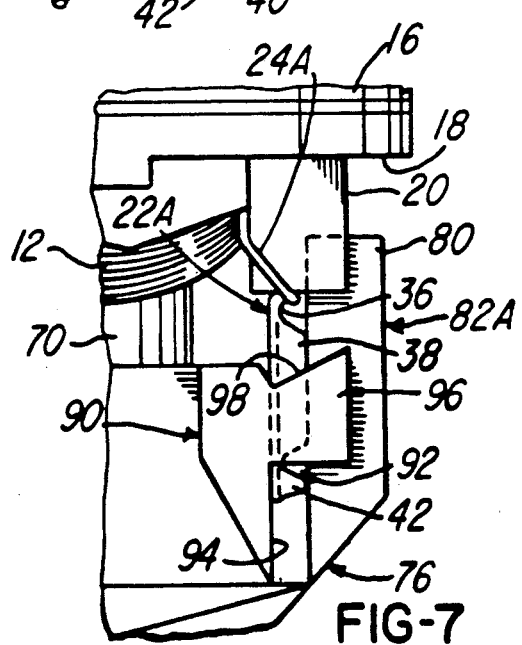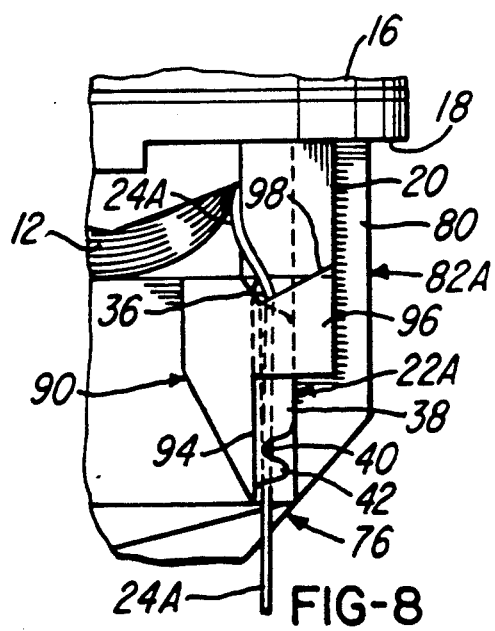

APPARATUS FOR INSERTING STATOR COIL LEAD WIRES INTO TERMINALS HAVING WIRE-RECEIVING CHANNELS

This is a continuation of copending application Ser. No. 07/511,413 filed on Apr. 20, 1990, now abandoned.

SUMMARY OF THE INVENTION

This invention relates to a method and an apparatus for inserting stator coil lead wires into terminals having wire-receiving channels. Although the invention is intended for use in the manufacture of electric motor stators, aspects of the invention may be useful in the manufacture of other electrical devices.

Two pole stators for universal electric motors typically have a pair of coils comprising magnet wire having an insulating coating wound around pole pieces formed on a laminated core. Each coil has two or more wire leads extending therefrom. A practice that has become commonplace in recent years is to mount terminals having wire-receiving channels on the stator cores adjacent the coils to which the coil leads are connected. One such terminal has a longitudinally-extending, U-shaped channel, with sidewalls that are notched to form tabs at their outer ends. During manufacture, a coil lead wire is laid into the channel and the tabs crimped together around the lead wire to temporarily clamp the lead wire. At a later stage in the manufacturing process, the channels are rolled around the lead wires to permanently secure the lead wires to the terminals and the tabs are cut away from the remaining parts of the terminals along with any excess lengths of lead wires extending therefrom. When the channels are rolled around the lead wires, a high voltage is applied to the terminals to melt the insulation on the lead wires and burrs or the like on the insides of the channels pierce into the lead wires to create a good electrical connection between the lead wires and the terminals.

In preparation for connection of stator coil leads to terminals having U-shaped lead-receiving channels, each of the coil leads is cut during the coil winding process to a length sufficient that it can be held by a wire clamp near the wound stator in a position wherein it extends across the face of the stator adjacent its associated terminal so that it may be mechanically manipulated to be connected to the terminal. In order to achieve connection of a coil lead to a terminal, one practice has been to use a machine generally of the type shown in U.S. Pat. No. 3,747,187 having mechanisms to align the coil leads with the channels, to tamp the leads into the channels, and to crimp the sidewalls of the tabs against the lead wires. Such machines typically connect all four lead wires simultaneously. Excess lengths of the lead wire are cut away, usually at a different processing station, by a separate cutter mechanism in preparation for the presentation of the stator to the machine that permanently secures the lead wires to the terminals.

The wire handling and tab crimping mechanisms of the prior machines are fast-acting and reliable. However, each machine is dedicated to the manufacture of a stator of but one configuration. If it is desired to use the machine for manufacturing a differently configured stator, the machine usually must be practically completely rebuilt.

It is also known to use an industrial robot along with appropriate wire guides to lay the lead wires into the terminal channels and to use an auxiliary device to crimp the tabs against the wires. Use of a robot, particularly one that is readily programmable, offers the advantage that a robot can quickly be adopted for use with stators of differing configurations, so that fewer (or no) tooling changes are needed when converting from the manufacture of a stator of one configuration to the manufacture of a stator of a different configuration. However, a simple, programmable industrial robot can only be used to effect connection of one lead wire at a time, and it is necessary to meet high speed production requirements that the robot act with considerable speed.

Connection of the lead wires to terminals with channels has proved to be difficult to accomplish at a sufficiently high speed with sufficient reliability for mass production. When using a robot to insert lead wires into terminal channels, some means must be provided for guiding the wires into the channels and any corner of a channel around which the lead wire is extended must be protected against engagement by the lead wire. If not protected, the lead wire may snag on the corner and damage the terminal or the insulating coating on the lead wire may be scraped away which would create the potential for an electrical short to occur. Also, the number of movements needed for the end effector of the robot to accomplish its tasks should be kept to a minimum to achieve optimum speed of operation.

An object of this invention is to provide an improved method and apparatus for inserting stator coil lead wires into terminals having wire-receiving channels using an industrial robot.

In accordance with this invention, a stator locating and terminal support tooling assembly is partly inserted into the bore of a wound stator in order to securely locate the stator at a predetermined station. The tooling assembly has an arbor that fits snugly within the bore of the stator to hold it in position and surfaces that prevent engagement between the lead wires and parts of the terminals and surfaces that prevent the terminals from being bent as a result of the steps done to connect the lead wires to the terminals. The end effector of an industrial robot grips a first one of the coil lead wires sufficiently near the coil from which it extends that the stretch of wire between the coil and its gripped portion can be controllably manipulated. (If this stretch of wire is too long, it may be too flexible or rubbery to enable it to be satisfactorily handled during the terminal connection and wire cutting process.) The tooling assembly is partly retracted from the stator so as to expose a relieved portion of the terminal adjacent the end of the channel into which the wire is to be inserted without being so fully retracted that it fails to continue to hold the position of the stator. The gripped wire is laid over the terminal adjacent the end of its wire-receiving channel by movement of the robot end effector while the tooling assembly is partly retracted. The tooling assembly is then fully advanced toward the stator at which time the end of the channel is covered by parts of the tooling assembly. The robot is then manipulated to draw the wire lead into the channel of the terminal. During this time, parts of the terminal subjected to any bending forces are backed up by parts of the tooling assembly. Also, a camming surface provided on the tooling assembly in conjunction with the movement of the robot end effector cause the the lead wire to be located deeply within the channel.

The foregoing process enables the lead wire to be placed in the terminal channel accurately, reliably, and with minimal end effector motion. The same process is then repeated for placing the other lead wires into the other terminals.

This invention is shown and described in connection with a method for cutting each lead wire and for crimping the terminal tabs to the lead wires. However, the invention may be used with more conventional processes in which separate cutters and crimping mechanisms are used.

Other objects and advantages will become apparent from the following description and the drawings.

BRIEF DESCRIPTION OF THE DRAWINGS

FIG. 1 further shows a portion of a robot for manipulating the wire to lay it into the terminal channels and to cut the lead wires against the cutting blades.

FIGS. 3 through 6 are enlarged, fragmentary perspective views and illustrate in succession steps for completing the insertion of the lead wire into the terminal channels, the cutting of the lead wire and the temporary connection of the lead wire to the terminal.

FIG. 7 is an enlarged fragmentary plan view of parts of the tooling assembly and the stator with the tooling assembly moved partly away from the stator and represents a step in the method of this invention.

FIG. 8 is an enlarged, fragmentary plan view of the parts shown in FIG. 7, but with the tooling assembly fully advanced toward the stator.

FIG. 9 is an enlarged fragmentary perspective view illustrating the terminal with the lead wire temporarily connected thereto.

DETAILED DESCRIPTION

Figure 1:
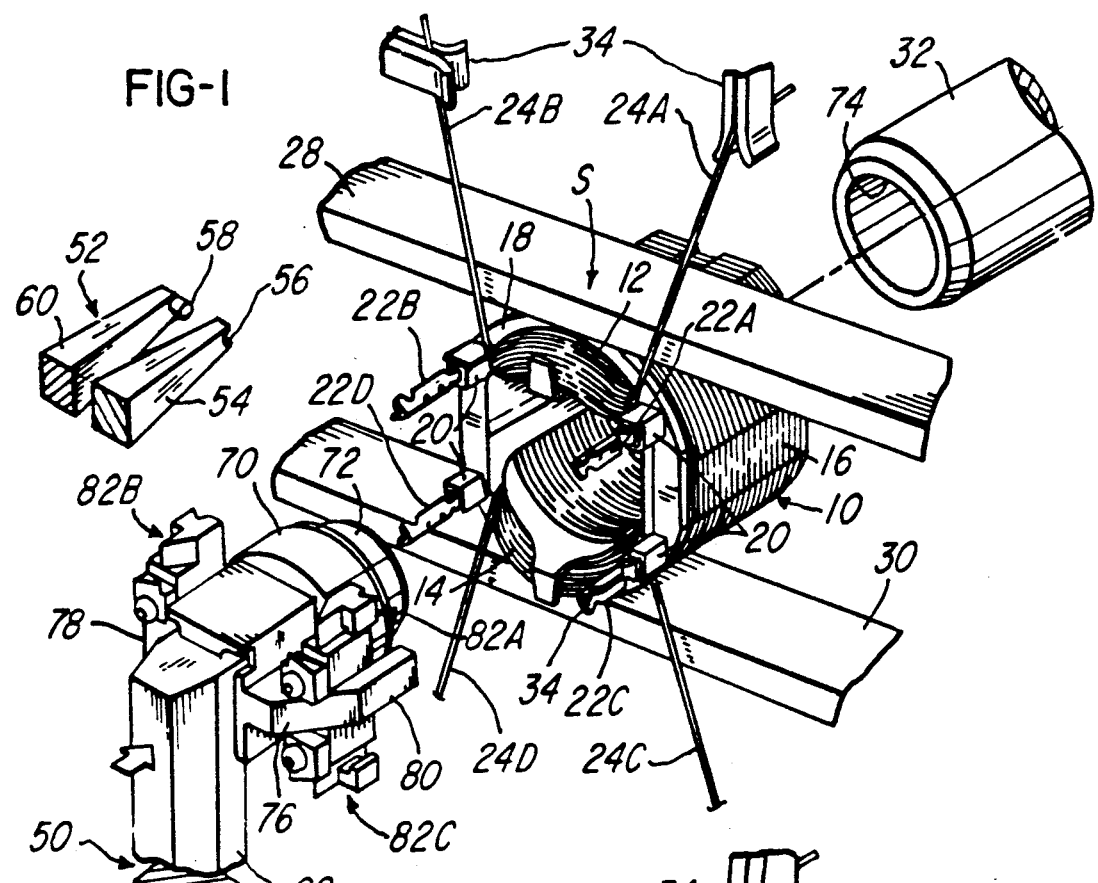
FIG. 1 is a simplified, fragmentary, partly schematic, and partly exploded perspective view of a wound stator with coil leads extending from the coils wound thereon, a conveyor track for the stator, wire clamps for releasably holding the coil leads, a transfer pin for transferring the stator along the track, and support and wire guide tooling for supporting the stator and the stator terminals and for guiding the coil lead wires into the stator terminals. The support and wire guide tooling in addition includes cutting blades in which the lead wires may be cut.

This invention is shown in connection with the manufacture of a 2-pole stator 10 comprising a pair of field coils 12 and 14 wound on pole pieces of a laminated stator core 16. The end face, designated 18, of the stator core 16 which is visible in FIG. 1 is formed from a plastic terminal mounting plate having four terminal-receiving sockets 20 in which are mounted terminals, collectively identified by reference number 22 herein but individually identified by numbers 22A, 22B, 22C, and 22D for coil lead wires, two for each coil 12 and 14, respectively designated 24A, 24B, 24C, and 24D, and collectively identified as lead wires 24 in this description.

The stator 10 is slidably supported and guided by upper and lower conveyor tracks 28 and 30. A transfer pin 32 adapted to fit within the bore of the stator 10 is used to move the stator 10 along the tracks 28 and 30. As known, the transfer pin 32 is mounted on a transfer carriage (not shown) on which four wire clamps 34, one for each of the lead wires, are also mounted. Only fragments of the upper two wire clamps 34 are illustrated in the drawings but it will be understood that there would also be two lower clamps 34. The clamps 34 may be of entirely conventional construction for the purposes of this invention and are not illustrated in detail herein.

At a preceding stage in the manufacture of the stator 10, the stator was located at a winding station (not shown) at which the coils 12 and 14 were wound and the lead wires 24A, 24B, 24C, and 24D inserted into the wire clamps 34 so that they extend across the stator end face 18 adjacent their respective terminals 22A, 22B, 22C, and 22D. After the coils 12 and 14 are wound and the coil lead wires 22A, 22B, 22C, and 22D connected to their respective clamps 34 at the winding station, the transfer pin 32 is inserted in the bore of the stator 10 and the transfer carriage moved to the station S shown in FIG. 1 in readiness for the temporary connection of the lead wires 24, to the terminals 22. The transfer pin 32 is shown spaced from the stator 10 in FIG. 1 to show its end configuration. In practice, the transfer pin would remain in the bore of the stator 10 in the station S throughout the process described below.

The illustrated terminals 22 are of a type commercially available from AMP Incorporated of Harrisburg, Pennsylvania. Each terminal 22 has a longitudinally-extending, wire-receiving channel 35 spaced from its associated socket 20 by a short spacer or channel entry relief section 36. The sidewalls 38 of the channel 34 have notches 40 near their outer ends and form tabs 42 at the outer end of the terminal 22 which may be crimped or squeezed together as shown in FIG. 9, to temporarily connect the lead wires to the terminals without changing the shape of the rest of the terminal 22. As previously mentioned, the remaining portion of the channels 35 are rolled around their respective lead wires at a different processing station (not shown). The notched outer ends of the terminals 22 are cut away at the same station along with any excess lengths of the lead wires.

This invention is used in connection with a process for temporarily connecting the lead wires 24 to the terminals 22 utilizing a tooling assembly 50 and an industrial robot. The robot is not shown except for its end effector, designated 52. As best shown in FIG. 1, the end effector 52 is pliers-like in form and has a first jaw 54 having a notch 56 at its outer end adapted to receive a pin 58 extending from the outer end of a second jaw 60. Jaws 54 and 60 are movable horizontally toward and away from each other, as is common in industrial robots, and, for reasons which will become apparent, the gripper jaws 54 and 60 are so controlled that the clamping pressures applied by them can be varied. For example, as will be readily recognized by those familiar in the art, the gripper jaws 54 and 60 may be controlled by a variable air actuator. Otherwise, the robot may be entirely conventional and is not further illustrated herein. Although different types of robots may be useful in the practice of this invention, a three-axis Cartesian robot, such as is available from Hirata Corporation of America, 3901 Industrial Blvd., Indianapolis, Indiana 46254, is presently preferred.

The tooling assembly 50 comprises a mounting block 62 affixed in any suitable fashion to the top of a stanchion 64 which is supported for sliding movement toward and away from the conveyor tracks and the stator 10 supported thereby in the station S shown in FIG. 1. As diagrammatically illustrated in FIG. 1, the stanchion 64 is guided for sliding movement, such as by a support channel 66, and driven toward and away from the stator 10 by a tooling positioning actuator 68, which preferably comprises a compound air cylinder but could comprise some other drive mechanism.

Projecting forwardly toward the stator 10 from the mounting block 62 are a first, larger diameter arbor section 70 adapted to be snugly received within the bore of the stator 10 at the lead connect station S, and a second, smaller diameter arbor section 72 adapted to be received snugly within a bore 74 in the confronting end of the transfer pin 32. Mounting block 62 has a pair of laterally extending horizontal tooling support plates 76 and 78, each having an outer side arm 80 projecting toward the stator 10 at station S. (Only the side arm 80 of the support plate 76 is illustrated—the opposite side arm is hidden.) As a stator 10 approaches station S, the tooling assembly 50 is remote from the station S so that it does not interfere with the movement of the stator along the conveyor tracks. When a stator 10 reaches station S, the tooling positioning actuator 68 is energized to move the tooling assembly 50 toward the stator 10. As it does so, the smaller diameter arbor section 72 enters the bore 74 of the transfer arm 32 and the larger diameter arbor section 70 enters the bore of the stator 10. Movement of the tooling assembly 50 toward the stator 10 continues until the arm 80 abut against the end face 18. By this arrangement, the tooling assembly 50 is accurately located with respect to the stator 10 at station S. Lateral movements of the stator 10 are prevented by the arbor sections 70 and 72. Vertical movements as well as rotary movements of the stator 10 are prevented by the conveyor tracks and also by the tooling assembly 50 as will be apparent.

Support plate portion 76 supports an upper right tooling subassembly 82A and a lower right tooling subassembly 82C while support plate portion 78 supports an upper left tooling subassembly 82B and a lower left tooling subassembly (not shown). The tooling subassemblies 82 are mutually identical except for the orientation of the parts thereof as will also become apparent. The upper right side tooling subassembly 82A includes a generally L-shaped terminal backup block or platen 90 mounted on the right side support plate 76 that has an upwardly facing, horizontal shoulder 92 over which the upper right side terminal 22A lies when the stator 10 is at station S and a sidewardly facing vertical face 94 which extends the entire length of the portion of the terminal 22A that projects out of its socket 20. Projecting laterally from the vertical face 94 is an upper terminal sidewall guard block 96 that, when the stator 10 is at station S and the tooling assembly 50 fully advanced toward the stator 10, closely overlies the upper terminal sidewall 38 to prevent the lead wire 24A from snagging against the corner of the upper sidewall 38 nearest its associated socket 20 The leading surface, designated 98, of the sidewall guard block 9 is angled forwardly and outwardly and forms a camming surface of reasons discussed below.

Tooling subassembly 82A further comprises a wire-cutting blade 100 having a vertical knife edge 102 projecting upwardly from an upwardly facing shoulder 104 and connected to the platen block 90 as by a screw 106.

Figure 2:
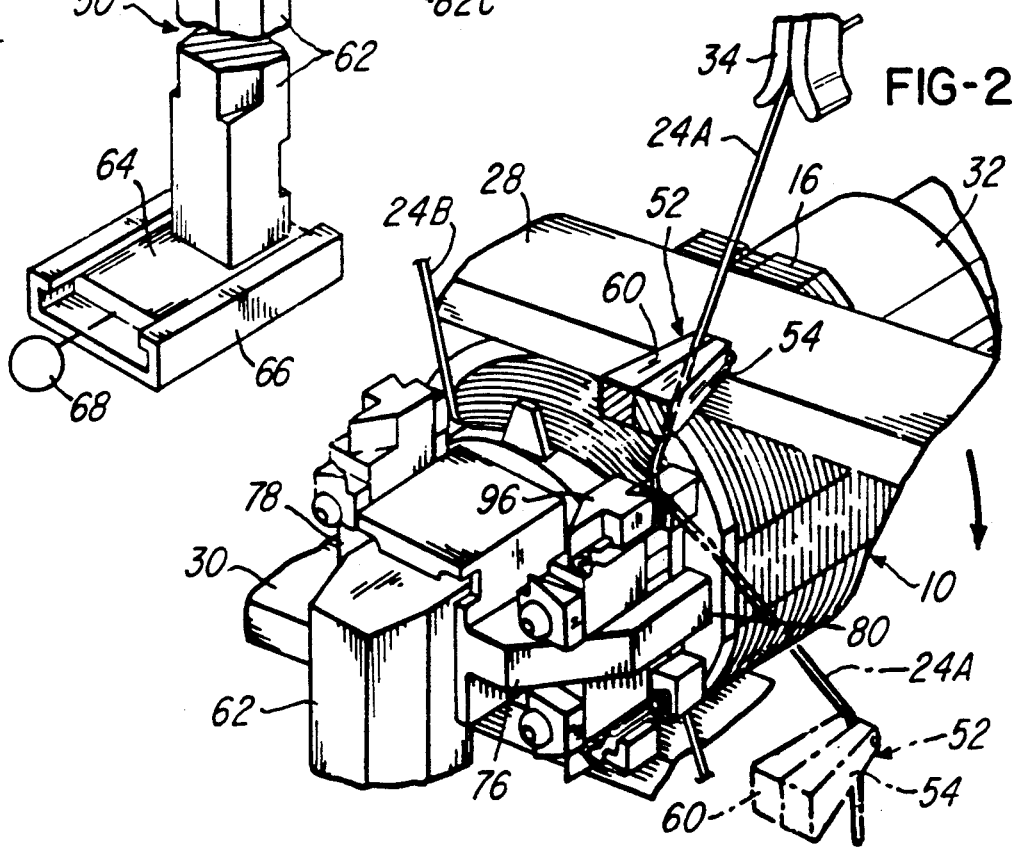
FIG. 2 is an enlarged, fragmentary perspective view of the parts shown in FIG. 1 and illustrates the initial steps of inserting a coil lead wire into wire-receiving channels of a terminal.
Figure 3:
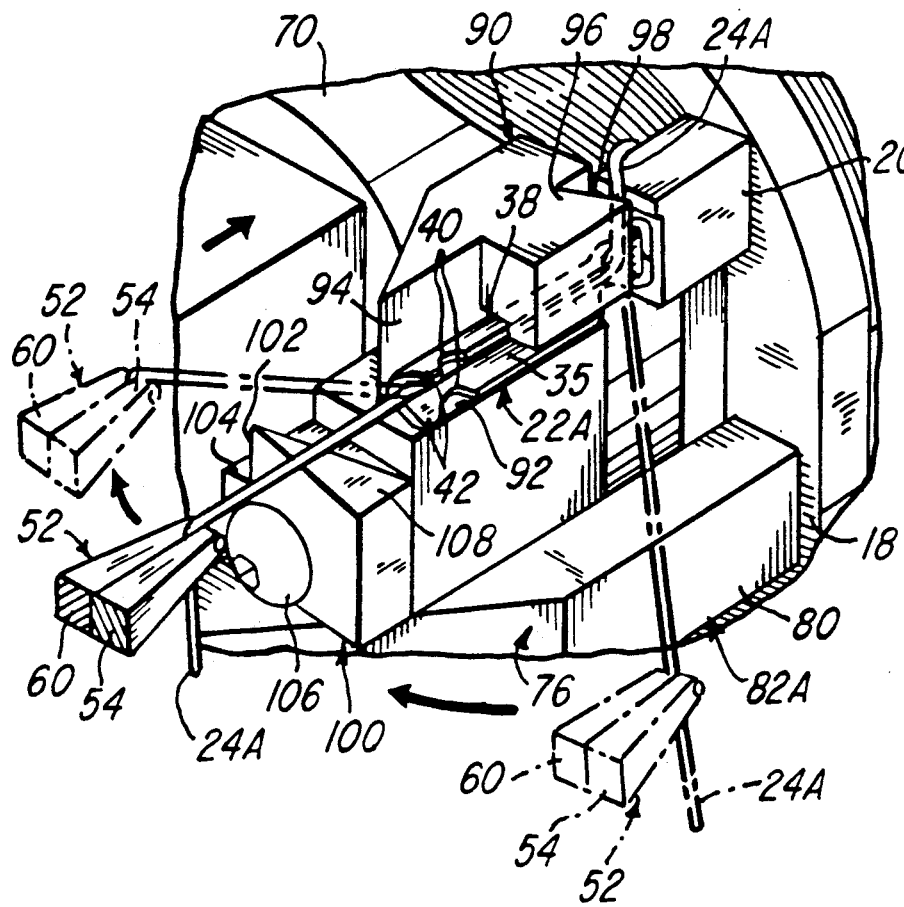
Figure 4:
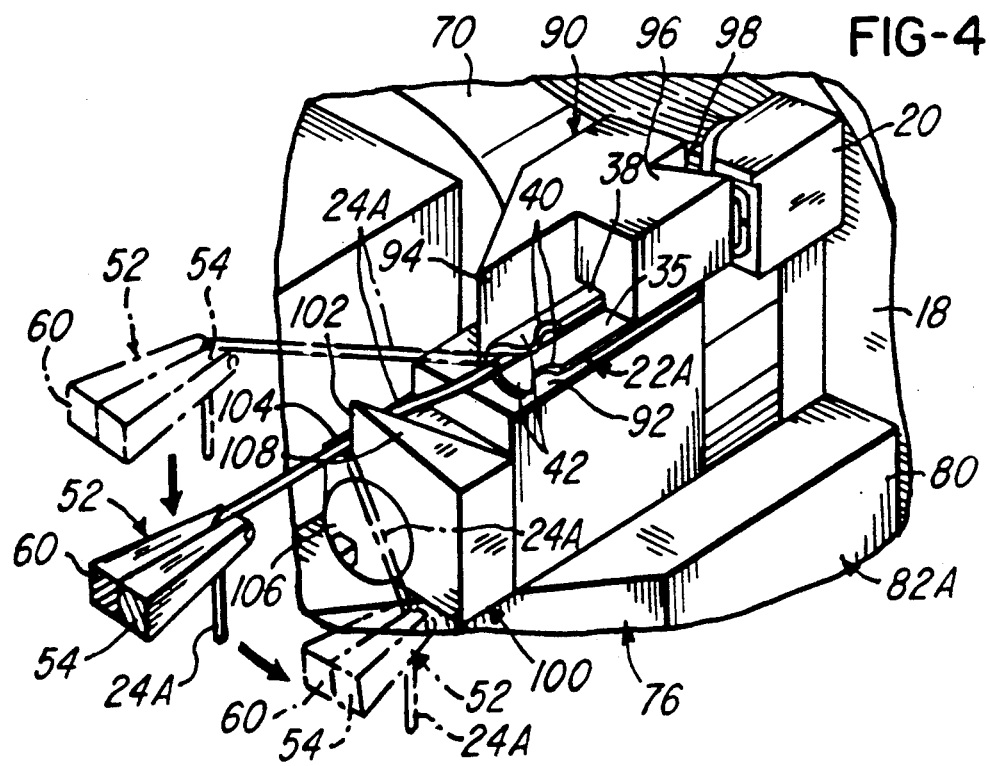

In operation, when a stator 10 reaches the station S, the tooling assembly 50 is driven by the positioning actuator 68 into the position shown in FIGS. 3, 4 and 8, fully advanced toward the stator 10. The arbor sections 70 and 72 advance into engagement within the transfer pin 32 and the bore of the stator 10 to insure that the stator 10 is accurately positioned. The robot is then activated so that its end effector 52 moves into a location where it can grip the lead wire 24A near the upper stator coil 12 as shown in FIG. 2. When the lead wire 24A is first gripped by the jaws 54 and 60, the clamping pressure is sufficiently low that the jaws 54 and 60 will slide along the lead wire 24A as portions of the lead wire 24A are manipulated by the end effector 52. At a later stage, described below with reference to FIG. 4, 5 and 6, the clamping pressure is increased so that the lead wire 24A is firmly clamped for purposes of stretching and severing the lead wire 24A against the knife edge 102.

The clamp assemblies 34 are preferably operable so that their grip on the lead wires can be released. If so, the clamp assembly 34 associated with the lead wire 24A is operated to release its grip thereon after the lead wire 24A is gripped by the end effector 52. Optionally, the clamp assemblies 34 may clamp the coil lead wires with such a low clamping pressure that it would not be necessary to release the lead wires; the lead wires will simply be pulled from their respective clamps 34 by subsequent processing steps.

After the end effector 52 grips the lead wire 24A, the tooling positioning actuator 68 is energized to pull the tooling assembly 50 partly away from the stator 10, but not so far that the arbor sections 70 and 72 are pulled away from engagement with the transfer pin 32 and the bore of the terminal 10. The partial retraction of the tooling assembly 52 exposes the channel entry relief portion 36 of the terminal 22A in readiness for further movement of the end effector 52.

With reference to FIGS. 2, 3 and 7, with the coil lead 24A held clamped by the end effector 52, and the tooling assembly 50 partly retracted, the end effector 52 is driven by the robot mechanism in one motion downwardly and sidewardly away from the stator 10 (to the right as viewed in FIGS. 2 and 3) which causes the lead wire 24A to be coursed over a top corner of the associated socket 20 and extended downwardly alongside the channel entry portion 36 of the terminal 22A. Immediately thereafter, the tooling assembly 50 is returned to its fully advanced position shown in FIGS. 4 and 8. As a result, the guard block 96 covers the end of the upper terminal channel sidewall 38 nearest the associated socket 20. The end effector is then moved upwardly, backwardly away from the stator 10, and toward the center of the stator 10 to the position shown by full lines in FIG. 3 so that lead wire 24A is laid into the channel 35 and continues to move toward the center axis of the stator into the phantom line position shown on the left side of FIG. 3 where it is drawn horizontally, and upwardly if necessary, past the vertical edge of the knife edge 102. During the movements of the end effector illustrated in FIG. 3, the portion of the lead wire 24A engaging the bottom edge of the camming surface 98 of the guard block 96 is cammed toward the bight of the terminal 22A, so that the lead wire 24A is located deeply within the channel 35.

The movements of the end effector 52 may continue as illustrated in FIGS. 4, and 5, first downwardly to position the lead wire 24A adjacent the knife edge 102, and then outwardly (to the right) and downwardly as shown in FIG. 4 to pull the lead wire 24A against the knife edge 102 and the point where it joins the shoulder 104. As shown in FIG. 5, the end effector then moves horizontally outwardly to stretch and ultimately break the lead wire 24A at the knife edge 102.

With reference to FIGS. 5, the severed end of the lead wire 24A is s stretched over the knife edge 102 that it grips the knife edge 102 to resist any tendency of the lead wire 24A to bounce back out of the terminal channel 35. Further to this end, the knife edge 102 is formed in part from an angled blade surface 108 that faces generally toward the platen 90. If the severed end of the lead wire 24A should become disengaged from the knife edge 102, any tendency it has to bounce back will be resisted by the sloping blade surface 108.

With the lead wire 24A thus held in the terminal channel 35, the end effector 52 may be so manipulated that its jaws 54 and 60 are separated to release the remnant, cut away portion of the lead wire 24A, the jaws 54 and 60 closed on one another as shown in FIG. 6 which provides the opportunity for the end effector 52 to press the wire gripping tabs 42 around the lead wire 24A by pressing the tabs 42 downwardly against the platen shoulder 92. The resultant temporary connection of the lead wire 24A to the terminal 22A is shown in FIG. 9.

Here it should be noted that the length of the unsupported stretch of the lead wire 24A between the the end effector 52 and parts of the terminal 22A and its socket 20 which ar engaged by the lead wire 24A remains substantially constant throughout the manipulation of the lead wire 24A by the end effector 52. This is because the end effector jaws 54 and 60 slide along the lead wire 24A toward its free end as needed to accommodate the lengths of the lead wire 24A coursed along the terminal 22A and over its socket 20. This stretch of wire also stays relatively taut because the movements of the end effector 52 are in directions tending to pull the lead wire 24A from its coil 12. Accordingly, such stretch of wire is relatively short and taut and, therefore, remains controllable throughout the process.

Prior to the sideward, wire-severing movement of the end effector 52, the clamping pressure exerted by its jaws 54 and 60 on the wire is increased so that they firmly clamp the free end of the lead wire 24A so that it will not slide off the lead wire 24A as it is being stretched and broken.

It will be readily understood that the method of temporarily connecting the lead wires 24B, 24C, and 24D to their respective terminals 22B, 22C, and 22D is the same as that described above for connecting the lead wire 24A to its terminal 22A, except that the motions of the end effector 52 are so modified as needed to cause it to undergo the same relative motions with respect to the parts to be connected.

It will be noted that many of the tooling parts are chamfered to provide "lead ins" for the parts as they move toward one another. Since this is a standard practice, the chamfering of parts is not further discussed herein.

As previously noted, the lead wires 24 extend over the corners of their respective sockets 20. This is a condition that may be specified by the stator manufacturer. In other cases, the sockets may be shorter, rounded, or otherwise unsuited to support parts of the lead wires. In such cases the movements of the end effector may be slightly different and tooling subassemblies may be modified, particularly as to the extent and slope of the camming surface 98. Such modifications are commonly practiced and are well within the skill of tradesmen who work with tooling of this type.

Although the presently preferred embodiments of this invention have been described, it will be understood that within the purview of this invention various changes may be made within the scope of the appended claims.

We claim:

1. Apparatus for manufacturing stators having a stator core having an end face with terminal-receiving sockets and terminals held by said sockets, each of said terminals having a trough-like, longitudinally-extending, wire-receiving channel spaced from its associated socket by a spacer portion thereof, said stators further having plural lead wires, each said lead wire having a fixed end extending from a stator coil wound on said stator core and a free end held by a clamp so that it extends alongside its associated said socket, said apparatus comprising:

a terminal support and shield member having surfaces for shielding said spacer portion and the outer surfaces of said terminals from contact by said lead wires and for preventing substantial bending of portions of said terminals that otherwise may be caused when said lead wires are inserted into said channels;

a robot having an end effector that successively grips said lead wires and manipulates said lead wires to insert said lead wires into said terminal channels; and means for moving said terminal support and shield member away from said stator core to expose said spacer portion in advance of the movement of said end effector to locate each said lead wire across its associated said spacer portion.

2. The apparatus of claim 1 wherein said terminal support and shield member includes means for camming said lead wires into said channels.

3. The apparatus of claim 1 wherein said terminal support and shield member includes plural wire cutting blades, one for each of said terminals, against which said lead wires may be pulled by said robot in order to sever said lead wires.

4. Apparatus for manufacturing stators having a stator core having an end face with terminal-receiving sockets and terminals having wire-crimping tabs held by said sockets, each of said terminals having a trough-like, longitudinally-extending, wire-receiving channel, said stators further having plural lead wires, each said lead wire having a fixed end extending from a stator coil wound on said stator core and a free end held by a clamp so that it extends alongside its associated said socket, said apparatus comprising:

a terminal support and shield member having surfaces for shielding said outer surfaces of said terminals from contact by said lead wires and for preventing substantial bending of said terminals that otherwise may be caused when said lead wires are inserted into said channels, said terminal support and shield member including tab-support surfaces against which said tabs may be pressed to crimp said lead wires thereto; and a robot having an end effector that successively grips said lead wires and manipulates said lead wires to insert said lead wires into said terminal channels and operates to crimp said lead wires to said tabs by pressing said tabs and said lead wires toward said tab-support surfaces.

* * * * *